(12) United States Patent
Willhalm et al.

(10) Patent No.: US 12,380,005 B2
(45) Date of Patent: Aug. 5, 2025

(54) FAILOVER FOR POOLED MEMORY

(71) Applicant: Intel Corporation, Santa Clara, CA (US)

(72) Inventors: Thomas Willhalm, Sandhausen (DE); Francesc Guim Bernat, Barcelona (ES); Karthik Kumar, Chandler, AZ (US); Rita Gupta, Cedar Park, TX (US); Mark Schmisseur, Phoenix, AZ (US); Dimitrios Ziakas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 724 days.

(21) Appl. No.: 17/479,267

(22) Filed: Sep. 20, 2021

(65) Prior Publication Data
US 2022/0004468 A1 Jan. 6, 2022

(51) Int. Cl.
*G06F 11/20* (2006.01)
*G06F 9/445* (2018.01)
*G06F 9/50* (2006.01)
*G06F 11/14* (2006.01)
*G06F 12/14* (2006.01)

(52) U.S. Cl.
CPC ...... *G06F 11/2023* (2013.01); *G06F 9/44505* (2013.01); *G06F 9/5016* (2013.01); *G06F 11/1441* (2013.01); *G06F 12/1425* (2013.01); *G06F 12/1466* (2013.01)

(58) Field of Classification Search
CPC ............. G06F 11/2023; G06F 12/1425; G06F 9/44505; G06F 9/5016; G06F 12/14; G06F 12/1466; G06F 11/2043; G06F 9/5077; G06F 11/1484; G06F 11/2046; G06F 11/2033
See application file for complete search history.

(56) References Cited

U.S. PATENT DOCUMENTS

| 8,874,954 B1 * | 10/2014 | Gupte ................ G06F 11/2033 714/4.11 |
| 2012/0054409 A1 * | 3/2012 | Block .................. G06F 11/203 718/1 |
| 2013/0174224 A1 * | 7/2013 | Ueki ................... G06F 11/2035 726/4 |

(Continued)

OTHER PUBLICATIONS

Disaggregation and the Application, Angel et al., arXiv.org, (Year: 2019).*

(Continued)

*Primary Examiner* — Matthew M Kim
*Assistant Examiner* — Bryan P Huang
(74) *Attorney, Agent, or Firm* — Essential Patents Group, LLP

(57) ABSTRACT

An embodiment of an electronic apparatus may comprise one or more substrates, and a controller coupled to the one or more substrates, the controller to allocate a first secure portion of a pooled memory to a first instantiation of an application on a first node, and circuitry coupled to the one or more substrates and the controller, the circuitry to provide a failover interface for a second instantiation of the application on a second node to access the first secure portion of the pooled memory in the event of a failure of the first node. Other embodiments are disclosed and claimed.

15 Claims, 7 Drawing Sheets

(56) References Cited

U.S. PATENT DOCUMENTS

2013/0339533 A1* 12/2013 Neerincx .............. H04L 67/146
                                                                709/228
2017/0177508 A1*  6/2017 Kondou .............. G06F 12/1458

OTHER PUBLICATIONS

Extended European Search Report from European Patent Application No. 22188320.0 notified Feb. 2, 2023, 7 pgs.
IBM, "Failover authentication process flow", Mar. 6, 2021, XP093017739, Retrieved from the internet: <https://www.ibm.com/docs/en/7.0.0?topic=SSPREK_7.0.0/com.ibm.isam.doc_80/ameb_appl_guide/concept/con_failover_authe_proc_flow.htm>.
Notice of Allowance from European Patent Application No. 22188320.0 notified Dec. 6, 2023, 8 pgs.

* cited by examiner

| APP ID | KEY ID | FAILOVER SUPPORT | CERT |
|---|---|---|---|
| ID | ID | YES/NO | CERT VALUE |
| 0x323 | 0x2 | Yes | Certificate |
| ... | ... | ... | ... |
| ... | ... | ... | ... |

FIG. 7

FAILOVER FOR POOLED MEMORY

BACKGROUND

Memory pooling may refer to memory management technology for sharing memory among applications or compute nodes. Regions of the pooled memory may be dynamically allocated to applications from various compute nodes. Pool management technology facilitates one platform borrowing memory from other platforms to provide extra memory resources on an as-needed basis.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 7 is a block diagram of an example of failover metadata according to an embodiment.

DETAILED DESCRIPTION

Figure 1:
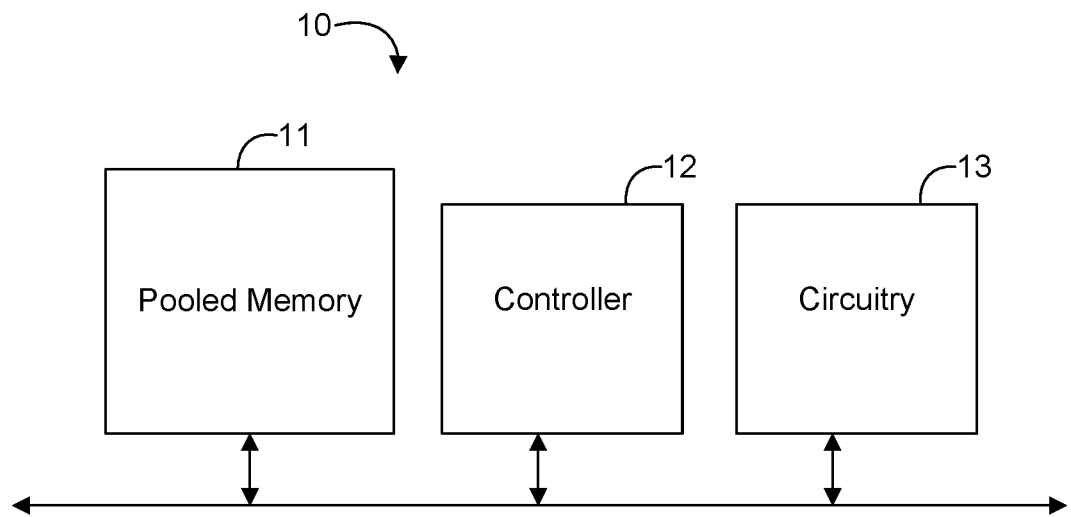
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, Field Programmable Gate Array (FPGA), firmware, driver, software, or any combination thereof. The material disclosed herein may also be implemented as instructions stored on a machine-readable medium, which may be read and executed by Moore Machine, Mealy Machine, and/or one or more processors. A machine-readable medium may include any medium and/or mechanism for storing or transmitting information in a form readable by a machine (e.g., a computing device). For example, a machine-readable medium may include read only memory (ROM); random access memory (RAM); Dynamic random-access memory (DRAM), magnetic disk storage media; optical storage media; NV memory devices; phase-change memory, qubit solid-state quantum memory, electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a three dimensional (3D) crosspoint memory device, or other byte addressable write-in-place nonvolatile memory devices. In one embodiment, the memory device may be or may include memory devices that use chalcogenide glass, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, or other suitable standard (the JEDEC standards cited herein are available at jedec.org).

With reference to FIG. 1, an embodiment of an electronic system 10 may include pooled memory 11, a controller 12 communicatively coupled to the pooled memory 11 to allocate a first secure portion of the pooled memory 11 to a first instantiation of an application on a first node, and circuitry 13 communicatively coupled to the controller 12. The circuitry 13 may be configured to provide a failover interface for a second instantiation of the application on a second node to access the first secure portion of the pooled memory 11 in the event of a failure of the first node. In some embodiments, the circuitry 13 may be further configured to authenticate the second instantiation of the application based on authentication information for the second instantiation of the application. For example, the circuitry 13 may be configured to compare the authentication information for the second instantiation of the application against a trusted source to determine if the authentication of the second instantiation of the application is successful.

In some embodiments, the circuitry 13 may be further configured to provide secure access information for the second instantiation of the application if the authentication is successful, and to associate the first secure portion of the pooled memory 11 with the second instantiation of the application. For example, the secure access information may include memory key information and/or an address of memory metadata that is needed to restart the second instantiation of the application. In some embodiments, the circuitry 13 may be further configured to store failover information in a second secure portion of the pooled memory 11, and synchronize the failover information with a host.

Embodiments may further handle multiple applications on a failed node. For example, where app1 and app2 are both on node 1 (that fails) with both applications being mapped onto the same memory in the pool, embodiments allow both app1 and app2 to reconnect to that memory from the same or different new nodes (e.g., app1 may come up on node 2 and app2 may come up on node 3). Embodiments may be configured to provide failover technology for pooled memories for N applications, where N>1. In some embodiments, the pooled memory 11 may be at different physical distances, including where the pool is in a different data center from the nodes.

Embodiments of each of the above pooled memory 11, controller 12, circuitry 13, and other system components may be implemented in hardware, software, or any suitable combination thereof. For example, hardware implementations may include configurable logic such as, for example, programmable logic arrays (PLAs), FPGAs, complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Embodiments of the controller 12 may include a general purpose controller, a special purpose controller, a memory controller, a storage controller, a micro-controller, a general purpose processor, a special purpose processor, a central processor unit (CPU), an execution unit, etc. In some embodiments, the pooled memory 11, the controller 12, the circuitry 13, and/or other system memory may be located in, or co-located with, various components, including a processor (e.g., on a same die).

Alternatively, or additionally, all or portions of these components may be implemented in one or more modules as a set of logic instructions stored in a machine- or computer-readable storage medium such as RAM, ROM, programmable ROM (PROM), firmware, etc., to be executed by a processor or computing device. For example, computer program code to carry out the operations of the components may be written in any combination of one or more operating system (OS) applicable/appropriate programming languages, including an object-oriented programming language such as PYTHON®, PERL, JAVA®, SMALLTALK, C++, C#, VHDL, Verilog, System C or the like and conventional procedural programming languages, such as the "C" programming language or similar programming languages. For example, the pooled memory 11, persistent storage media, or other system memory may store a set of instructions (e.g., which may be firmware instructions) which when executed by the controller 12 cause the system 10 to implement one or more components, features, or aspects of the system 10 (e.g., to allocating secure portions of the pooled memory 11 to the instantiations of the applications, providing the failover interface, etc.).

Figure 2:
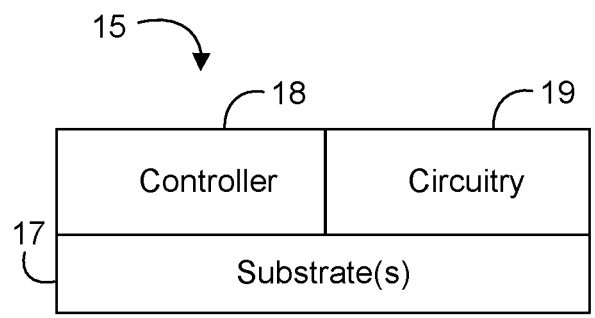
FIG. 2 is a block diagram of an example of an electronic apparatus according to an embodiment.

With reference to FIG. 2, an embodiment of an electronic apparatus 15 may include one or more substrates 17, a controller 18 coupled to the one or more substrates 17, the controller 18 to allocate a first secure portion of a pooled memory to a first instantiation of an application on a first node, and circuitry 19 coupled to the one or more substrates 17 and the controller 18. The circuitry 19 may be configured to provide a failover interface for a second instantiation of the application on a second node to access the first secure portion of the pooled memory in the event of a failure of the first node. In some embodiments, the circuitry 19 may be further configured to authenticate the second instantiation of the application based on authentication information for the second instantiation of the application. For example, the circuitry 19 may be configured to compare the authentication information for the second instantiation of the application against a trusted source to determine if the authentication of the second instantiation of the application is successful.

In some embodiments, the circuitry 19 may be further configured to provide secure access information for the second instantiation of the application if the authentication is successful, and to associate the first secure portion of the pooled memory with the second instantiation of the application. For example, the secure access information may include memory key information and/or an address of memory metadata that is needed to restart the second instantiation of the application. In some embodiments, the circuitry 19 may be further configured to store failover information in a second secure portion of the pooled memory, and synchronize the failover information with a host.

Embodiments of the circuitry 19 may be implemented in a system, apparatus, computer, device, etc., for example, such as those described herein. More particularly, hardware implementations of the circuitry 19 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the circuitry 19 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON®, PERL, JAVA®, SMALLTALK, C++, C#, VHDL, Verilog, System C or the like and conventional procedural programming languages, such as the "C" programming language or similar programming languages.

For example, the circuitry 19 may be implemented on a semiconductor apparatus, which may include the one or more substrates 17, with the circuitry 19 coupled to the one or more substrates 17. In some embodiments, the circuitry 19 may be at least partly implemented in one or more of configurable logic and fixed-functionality hardware logic on semiconductor substrate(s) (e.g., silicon, sapphire, gallium-arsenide, etc.). For example, the circuitry 19 may include a transistor array and/or other integrated circuit components coupled to the substrate(s) 17 with transistor channel regions that are positioned within the substrate(s) 17. The interface between the circuitry 19 and the substrate(s) 17 may not be an abrupt junction. The circuitry 19 may also be considered to include an epitaxial layer that is grown on an initial wafer of the substrate(s) 17.

Figure 3:
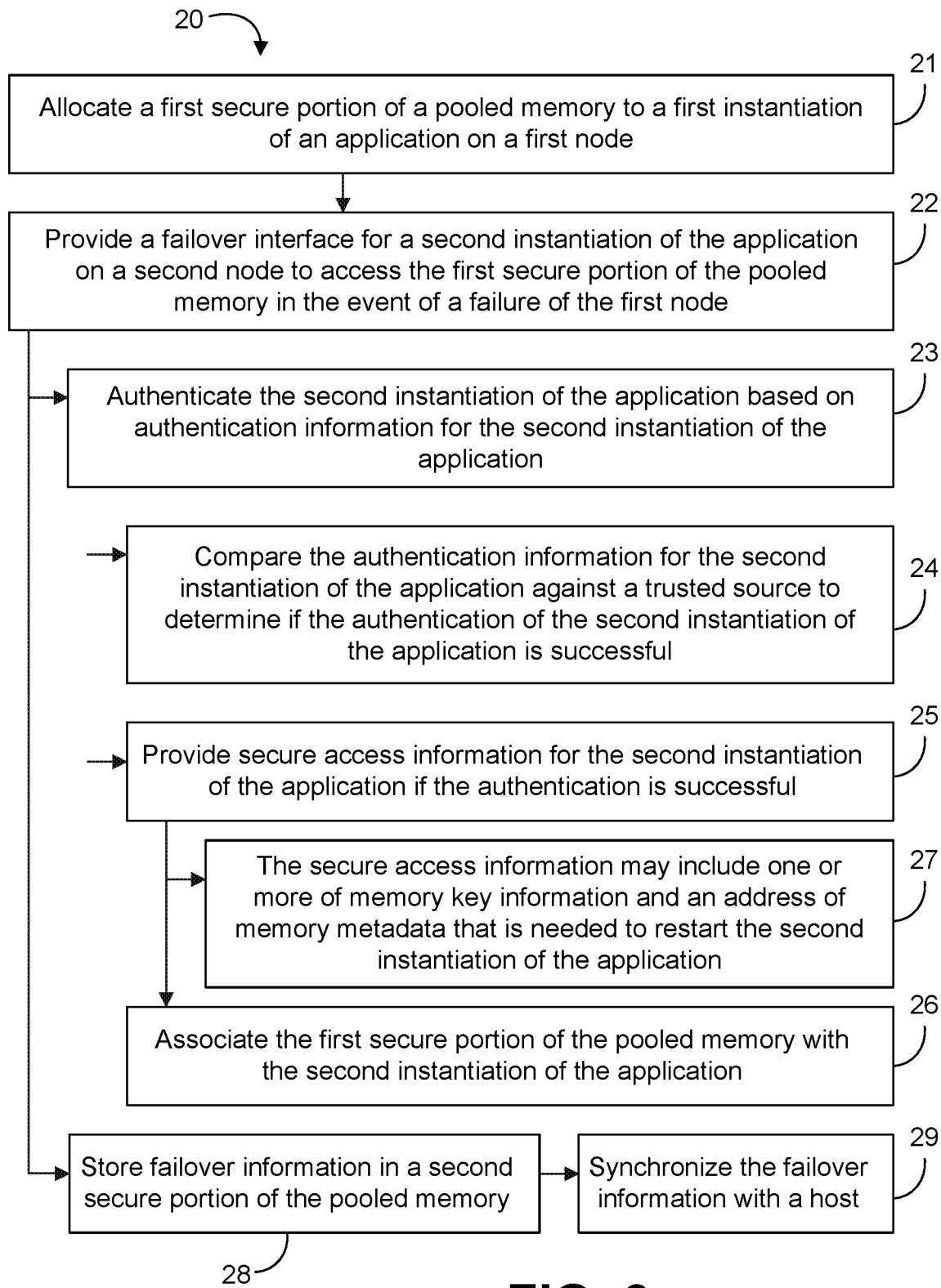
FIG. 3 is a flowchart of an example of a method according to an embodiment.

Turning now to FIG. 3, an embodiment of a method 20 may include allocating a first secure portion of a pooled memory to a first instantiation of an application on a first node at block 21, and providing a failover interface for a second instantiation of the application on a second node to access the first secure portion of the pooled memory in the event of a failure of the first node at block 22. Some embodiments of the method 20 may further include authenticating the second instantiation of the application based on authentication information for the second instantiation of the application at block 23. For example, the method 20 may include comparing the authentication information for the second instantiation of the application against a trusted source to determine if the authentication of the second instantiation of the application is successful at block 24.

In some embodiments, the method 20 may further include providing secure access information for the second instantiation of the application if the authentication is successful at block 25, and associating the first secure portion of the pooled memory with the second instantiation of the application at block 26. For example, the secure access information may include one or more of memory key information and an address of memory metadata that is needed to restart the second instantiation of the application at block 27. Some embodiments of the method 20 may further include storing failover information in a second secure portion of the pooled memory at block 28, and synchronizing the failover information with a host at block 29.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Hybrid hardware implementations include static dynamic System-on-Chip (SoC) re-configurable devices such that control flow, and data paths implement logic for the functionality. Alternatively, or additionally, the method 20 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON®, PERL, JAVA®, SMALLTALK, C++, C#, VHDL, Verilog, System C or the like and conventional procedural programming languages, such as the "C" programming language or similar programming languages.

For example, the method 20 may be implemented on a computer readable medium. Embodiments or portions of the method 20 may be implemented in firmware, applications (e.g., through an application programming interface (API)), or driver software running on an OS. Additionally, logic instructions might include assembler instructions, instruction set architecture (ISA) instructions, data set architecture (DSA) commands, (machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, Moore Machine, Mealy Machine, etc.).

Some embodiments may advantageously provide failover technology for pooled memories. A wide-variety of cloud usages may benefit from advanced interconnect technology and in-memory computing. For example, in-memory computing may enable a wide variety of useful real-time analytics. Such real-time analytics, however, needs sufficient memory capacity to perform operations in-memory. Having sufficient high-capacity memory in a single platform may be prohibitively expensive. With memory pools, a platform can "borrow" memory from the pool, on an as-needed basis, and the memory that is borrowed can appear as memory available to the in-memory computing application. Advanced interconnect technology, such as Compute Express Link (CXL®), provide reasonable access characteristics to the memory borrowed from the memory pool.

When a failure occurs in a compute node or application, there is a problem in terms of how to handle the application's memory in the pooled memory. For example, when security technology is applied to the application's memory in the pooled memory (e.g., encryption), conventional technology may destroy the contents of the application's memory in the pooled memory and restart the computation all over from scratch because, at the time of failover, the conventional technology cannot re-authenticate a new instance of the application against the memory in the pool. Starting over from scratch incurs a high performance penalty, in terms of both compute and bandwidth. Advantageously, embodiments provide failover technology that overcomes one or more of the foregoing problems. Some embodiments may provide memory protection technology to allow low latency instantiation of an application to a new node when a node fails.

Figure 4:
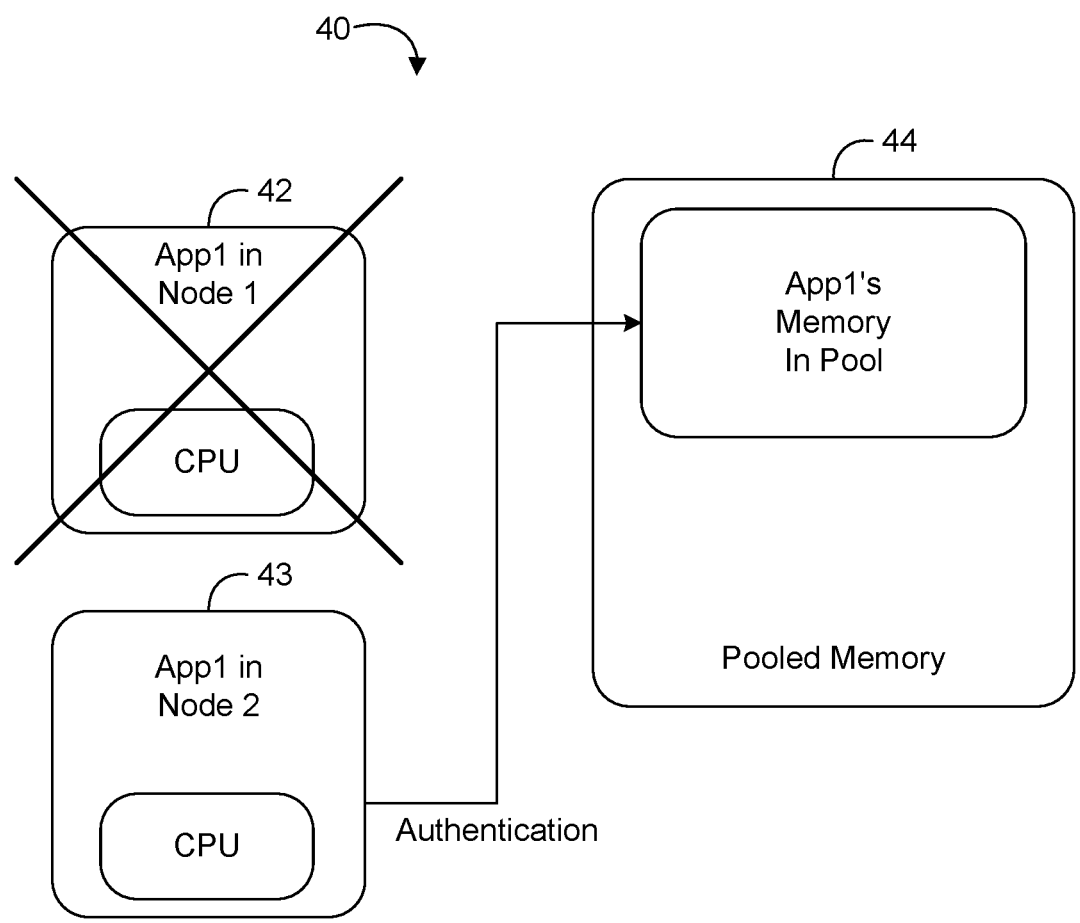
FIG. 4 is a block diagram of an example of a compute environment according to an embodiment.

With reference to FIG. 4, an embodiment of a compute environment 40 may include a first compute node 42 (Node 1), a second compute node 43 (Node 2) and pooled memory 44 (e.g., a shared memory pool). The compute nodes 42, 43 (Node 1 and Node 2) may represent computing platforms (e.g., a physical server, a VM, a container in a physical server, etc.). An application App1 may have been running on a Node 1, and Node 1 may have had some memory carved out in the pooled memory 44. The memory that is carved out for Node 1 in the pooled memory 44, as often may be the case, is encrypted with private keys through any suitable secure technology. If Node 1 fails, as illustrated in FIG. 4, the memory pool 44 still holds App1's secure data in-memory.

In accordance with some embodiments, a new instantiation of App1 on Node 2 (e.g., Node 2 may be spun up as a new node, and Node 2 may be used to spin up App1 that was in the failed Node 1), as shown in FIG. 4, may reclaim/reconnect to/re-attach to what was Node 1's memory in the pooled memory 44. Advantageously, embodiments provide technology for App1 to be authenticated, in a secure manner, with the same level of security that existed between Node 1 and its pool, even if Node 1 employed the usage of secure technologies for its memory in the pooled memory 44. Advantageously, embodiments provide technology to handle memory re-authentication in the case of failover and reduce or avoid performance penalties and slowdown of loading/restarting from shared cloud storage.

Figure 5:
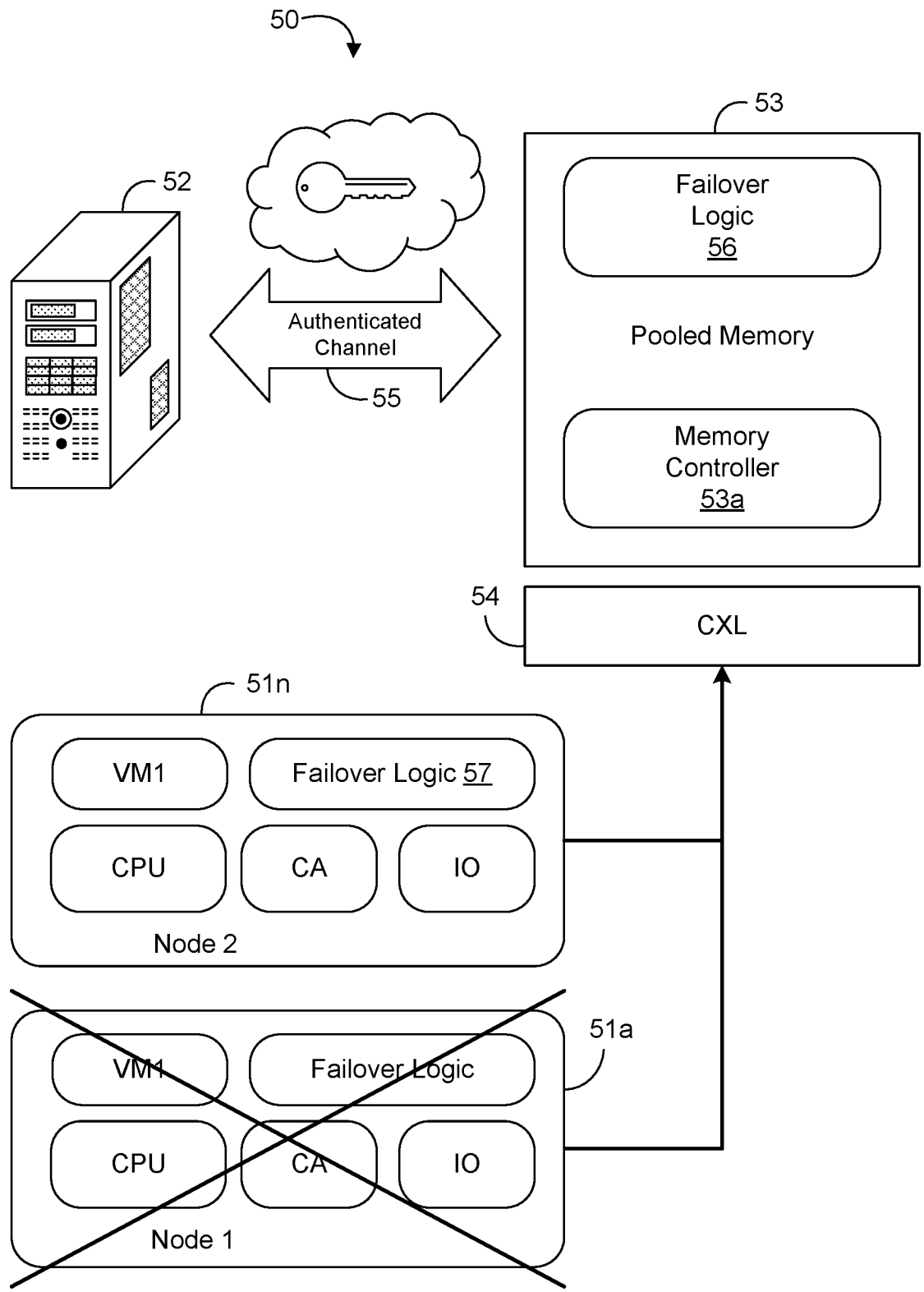
FIG. 5 is a block diagram of another example of a compute environment according to an embodiment.

With reference to FIG. 5, an embodiment of a compute environment 50 include two or more compute nodes 51a through 51n (collectively "compute node(s) 51"), an orchestrator node 52 (e.g., which may be a physical server or other infrastructure), and pooled memory 53 communicatively coupled to the compute nodes 51 via an interface 54 (e.g., CXL) and communicatively coupled to the orchestrator node 52 via an authenticated channel 55. The pooled memory 53 includes a memory controller 53a, failover logic 56, and interfaces that allow a new instantiation of a failed application to authenticate itself, get a key id that was used in its original deployment that was used to encrypt data in a memory range for the application in the pooled memory 53 (e.g., using any suitable memory encryption mechanisms), and associate the memory range to the new instance of the application. The platform/compute node 51 includes failover logic 57 configured to instantiate an application, configure the key ids to the application, and re-use the memory range that was used by the application in the previous node before failing.

In an example process flow for an embodiment of failover for pooled memory: 1) virtual machine VM1 is running on compute node 51 when compute node 51a fails; 2) the orchestration node 52 spawns VM1 on compute node 51n (e.g., a new platform); 3) VM1 authenticates itself against the pooled memory 53 using the failover logic 57 and an interface in the compute node 51n; 4) the failover logic 56 in the pooled memory 53 authenticates VM1 through a trusted server; 5) the pooled memory 53 acknowledges the success to the compute node 51n and provides a bit ID for the key associated to VM1; and 6) the CPU for the compute node 51n associates the key ID to VM1 (e.g., in a process address space ID (PASID) table entry).

The orchestrator node 52 (e.g., and associated software stack) are configured to support the failover technology. For example, the orchestrator node 52 may be configured to: 1) specify that a particular memory range associated to a particular application has to support failover; 2) support virtual machine (VM) authentication to the pool memory after node failure; and 3) setup the required operating system (OS) memory configuration (e.g., page tables, etc.) after the new instance of the application is instantiated and map the new instance of the application to the re-used memory. In some embodiments, the OS may use the pooled memory 53 to store data that is needed to re-start the application memory (e.g. page tables etc.). In some embodiments, the data that is needed to re-start the application memory is synchronized in a specified area of the pooled memory 53. For example, the data may be synchronized automatically every time the OS performs change on any of these elements.

Figure 6:
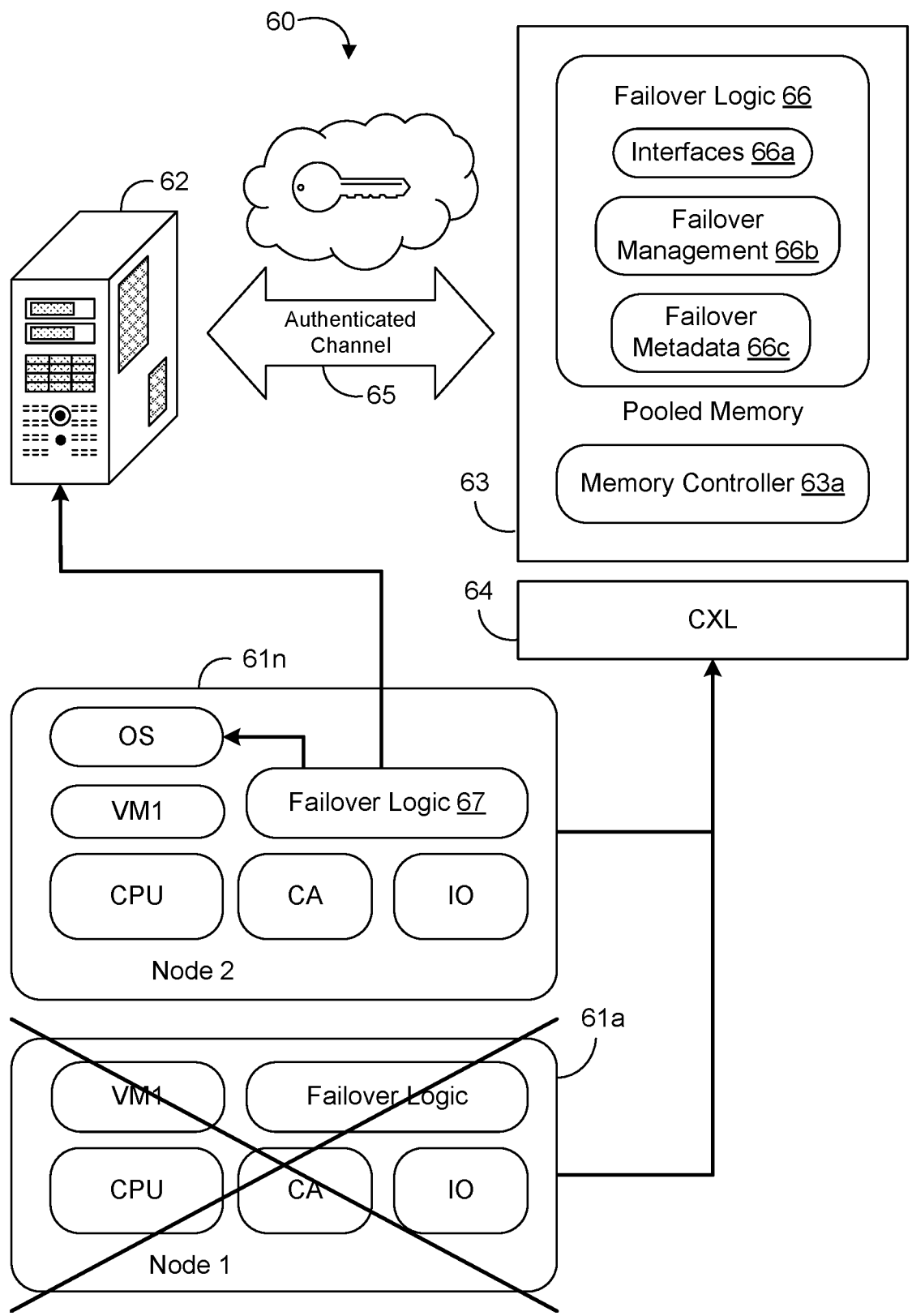
FIG. 6 is a block diagram of another example of a compute environment according to an embodiment.

With reference to FIG. 6, an embodiment of a compute environment 60 include two or more compute nodes 61a through 61n (collectively "compute node(s) 61"), an orchestrator node 62 (e.g., which may be a physical server or other infrastructure), and pooled memory 63 communicatively coupled to the compute nodes 61 via an interface 64 (e.g., CXL) and communicatively coupled to the orchestrator node 62 via an authenticated channel 65. The pooled memory 63 includes a memory controller 63a and failover logic 66. The failover logic 66 includes interfaces 66a, failover management logic 66b, and failover metadata 66c that allow a new instantiation of a failed application to authenticate itself, get a key id that was used in its original deployment that was used to encrypt data in a memory range for the application in the pooled memory 63 (e.g., using any suitable memory encryption mechanisms), and associate the memory range to the new instance of the application. The platform/compute node 61 includes failover logic 67 that allows instantiating an application, configuring the key ids to the application, and re-using the memory range that was used by the application in the previous node before failing.

For example, the interfaces 66a may include set of interfaces that are exposed in order to support the failover. One example interface may be provided to specify that a particular memory key that is used to specify that a particular memory key will use the failover mechanism. The interface just needs to specify the key ID. Another example interface may be provided to gather the memory key associated to an application that was running on a node that failed. For example, this interface may provide the following elements: 1) the identification of the application (e.g., the ID may be a universally unique ID (UUID) that is assigned by the data center or infrastructure owner); and 2) an authentication token. The authentication token may be either a proof of the application (e.g. signing a random number plus the timestamp) or a proof provided by the infrastructure itself. Another example interface may be provided to store the memory OS related meta-data for the application.

The failover management logic 66b may be configured to implement various process flows associated with the interfaces 66a. An embodiment of the failover management logic 66b may support a failover flow where: 1) the compute node 61a fails containing application 1 that was using Key A; 2) the orchestrator node 62 spawns a new instance of application 1 in the compute node 61n; 3) the OS boots application 1 in the compute node 61n; 4) application 1 provides a proof of identify to the OS and requests the OS to setup the memory range; 5) the OS will request the compute node 61n to interface with the pooled memory 63 to reclaim the memory key associated to application 1 by providing the proof of identify provided by application 1; 6) the pooled memory 63 will interface to a trusted server to get the certificate of the application (e.g., if not already known) and validate the proof; 7) the pooled memory 63 will return the key id to the compute node 61*n* on success along with the address where the memory meta-data needed by the operating system to restore application status is located; 8) the compute node 61*n* will configure the CPU (e.g., the state of the application) where the memory key ids are stored and return the state address to the OS; 9) the OS will be responsible to now access to the memory range where the state data was stored (e.g., page tables, etc.) and re-configure the state of application 1; and 10) application 1 is finally allowed to start.

In some embodiments, the failover logic 66 may support one or more policies that influence how the failover technology works. For example, some embodiments may support a policy to decide how to handle the situation if node 61*a* that fails somehow comes back up (e.g., maybe the node took longer than usual to reboot) and tries to reconnect to the same pooled memory (e.g., application 1 on node 61*n* has already reconnected, so this would mean allowing two copies of application 1 to connect). Depending on what was pre-specified by the policy, the failover logic 66 may allow both copies to connect, disallow the first instance from connecting, or notify the second instance of application 1 on the new node 61*n*.

The failover logic 67 of the compute node 61*n* may configured to provide interfaces that are exposed into the application to setup and access the failover technology. For example, the failover logic 67 may setup failover for an application (e.g., indicate whether failover is on/off for the application, provide memory meta-data for the application, etc.), and implement the failover process flow. The failover logic 67 may also be configured to implement various process flows associated with the interfaces that are exposed into the application.

The orchestrator node 62 (including, for example, a software stack thereof) is configured to support the failover technology. For example, the orchestrator node 62 may be configured to: 1) specify that a particular memory range associated to a particular application has to support failover; 2) support VM authentication to the pool memory after node failure; and 3) setup the required OS memory configuration (e.g., page tables, etc.) after the new instance of the application is instantiated and map the new instance of the application to the re-used memory. In some embodiments, the OS may use the pooled memory 63 to store the failover metadata 66*c* that is needed to re-start the application memory (e.g. page tables etc.). In some embodiments, the failover metadata 66*c* is synchronized in a specified area of the pooled memory 63. For example, the failover metadata 66*c* may be synchronized automatically every time the OS performs change on any of these elements.

With reference to FIG. 7, an embodiment of failover metadata 70 may include a table indexed by an application ID (APP ID). The table includes entries with a number of fields associated to the APP ID. Example fields include a KEY ID that holds a value of a key ID for the application, a FAILOVER SUPPORT field (e.g., Y/N), and a CERT field that holds a value of an authentication certificate for the application. Those skilled in the art will appreciate that the failover metadata 70 is an example and that, depending on the environment, the failover metadata 70 may include more or fewer or other fields. Similarly, those skilled in the art will appreciate that the table structure for the failover metadata 70 is an example and that, depending on the environment, the failover metadata 70 may utilize other data structures or formats.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK® computing device, smart watch, smart glasses, smart bracelet, etc., and/or a client/edge device such as an Internet-of-Things (IoT) device (e.g., a sensor, a camera, etc.)).

Figure 8:
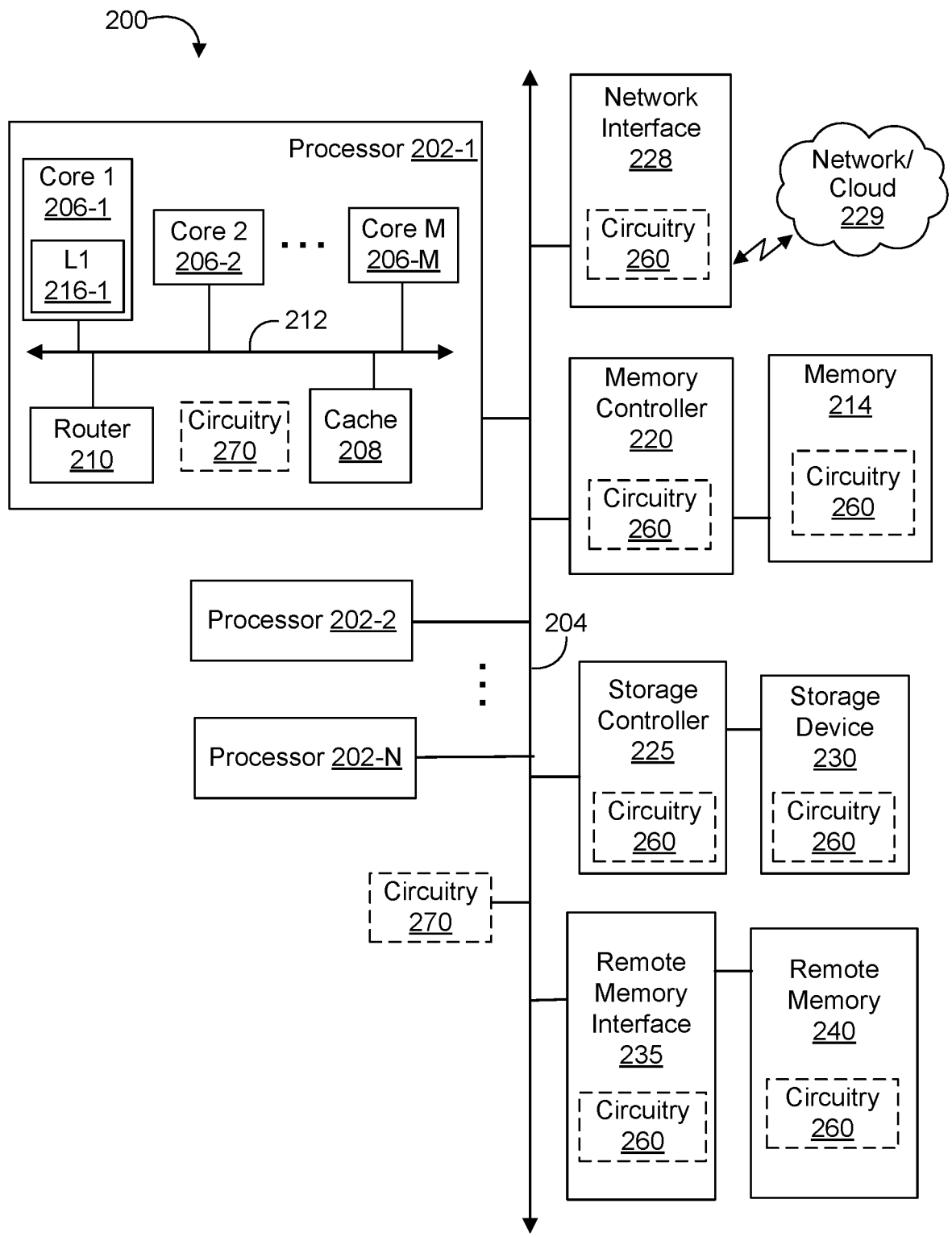
FIG. 8 is a block diagram of an example of a computing system according to an embodiment.

Turning now to FIG. 8, an embodiment of a computing system 200 may include one or more processors 202-1 through 202-N (generally referred to herein as "processors 202" or "processor 202"). The processors 202 may communicate via an interconnection or bus 204. Each processor 202 may include various components some of which are only discussed with reference to processor 202-1 for clarity. Accordingly, each of the remaining processors 202-2 through 202-N may include the same or similar components discussed with reference to the processor 202-1.

In some embodiments, the processor 202-1 may include one or more processor cores 206-1 through 206-M (referred to herein as "cores 206," or more generally as "core 206"), a cache 208 (which may be a shared cache or a private cache in various embodiments), and/or a router 210. The processor cores 206 may be implemented on a single integrated circuit (IC) chip. Moreover, the chip may include one or more shared and/or private caches (such as cache 208), buses or interconnections (such as a bus or interconnection 212), circuitry 270, memory controllers, or other components.

In some embodiments, the router 210 may be used to communicate between various components of the processor 202-1 and/or system 200. Moreover, the processor 202-1 may include more than one router 210. Furthermore, the multitude of routers 210 may be in communication to enable data routing between various components inside or outside of the processor 202-1.

The cache 208 may store data (e.g., including instructions) that is utilized by one or more components of the processor 202-1, such as the cores 206. For example, the cache 208 may locally cache data stored in a memory 214 for faster access by the components of the processor 202. As shown in FIG. 8, the memory 214 may be in communication with the processors 202 via the interconnection 204. In some embodiments, the cache 208 (that may be shared) may have various levels, for example, the cache 208 may be a mid-level cache and/or a last-level cache (LLC). Also, each of the cores 206 may include a level 1 (L1) cache (216-1) (generally referred to herein as "L1 cache 216"). Various components of the processor 202-1 may communicate with the cache 208 directly, through a bus (e.g., the bus 212), and/or a memory controller or hub.

As shown in FIG. 8, memory 214 may be coupled to other components of system 200 through a memory controller 220. Memory 214 may include volatile memory and may be interchangeably referred to as main memory or system memory. Even though the memory controller 220 is shown to be coupled between the interconnection 204 and the memory 214, the memory controller 220 may be located elsewhere in system 200. For example, memory controller 220 or portions of it may be provided within one of the processors 202 in some embodiments. Alternatively, memory 214 may include byte-addressable non-volatile memory such as INTEL® OPTANE™ technology.

The system 200 may communicate with other devices/systems/networks via a network interface 228 (e.g., which is in communication with a computer network and/or the cloud 229 via a wired or wireless interface). For example, the network interface 228 may include an antenna (not shown) to wirelessly (e.g., via an Institute of Electrical and Electronics Engineers (IEEE®) 802.11 interface (including IEEE® 802.11a/b/g/n/ac, etc.), cellular interface, 3G, 4G, LTE, BLUETOOTH®, etc.) communicate with the network/cloud 229.

System 200 may also include a storage device such as a storage device 230 coupled to the interconnect 204 via storage controller 225. Hence, storage controller 225 may control access by various components of system 200 to the storage device 230. Furthermore, even though storage controller 225 is shown to be directly coupled to the interconnection 204 in FIG. 8, storage controller 225 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS® (NVMe), Serial Attached SCSI (SAS), Fiber Channel, CXL®, etc.) with one or more other components of system 200 (for example where the storage bus is coupled to interconnect 204 via some other logic like a bus bridge, chipset, etc.) Additionally, storage controller 225 may be incorporated into memory controller logic or provided on a same integrated circuit (IC) device in various embodiments (e.g., on the same circuit board device as the storage device 230 or in the same enclosure as the storage device 230).

Furthermore, storage controller 225 and/or storage device 230 may be coupled to one or more sensors (not shown) to receive information (e.g., in the form of one or more bits or signals) to indicate the status of or values detected by the one or more sensors. These sensor(s) may be provided proximate to components of system 200 (or other computing systems discussed herein), including the cores 206, interconnections 204 or 212, components outside of the processor 202, storage device 230, SSD bus, SATA bus, storage controller 225, circuitry 260, circuitry 270, etc., to sense variations in various factors affecting power/thermal behavior of the system/platform, such as temperature, operating frequency, operating voltage, power consumption, and/or inter-core communication activity, etc.

System 200 may also include remote memory 240 coupled to the interconnect 204 via remote memory interface 235. Hence, remote memory interface 235 may control access by various components of system 200 to the remote memory 240. Furthermore, even though remote memory interface 235 is shown to be directly coupled to the interconnection 204 in FIG. 8, remote memory interface 235 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS® (NVMe), Serial Attached SCSI (SAS), Fiber Channel, CXL®, etc.) with one or more other components of system 200 (for example where the storage bus is coupled to interconnect 204 via some other logic like a bus bridge, chipset, etc.) Additionally, remote memory interface 235 may be incorporated into memory controller logic or provided on a same integrated circuit (IC) device in various embodiments (e.g., on the same circuit board device as the remote memory 240 or in the same enclosure as the remote memory 240).

As shown in FIG. 8, features or aspects of the circuitry 260 and circuitry 270 may be distributed throughout the system 200, and/or co-located/integrated with various components of the system 200. Any aspect of the system 200 that may require or benefit from pooled memory failover technology may include the circuitry 260 and/or the circuitry 270. In some embodiments, a memory pool may include memory from any of the cloud 229, the memory 214, the storage device 230, and/or the remote memory 240. For example, the memory 214, the memory controller 220, the storage controller 225, the storage device 230, the remote memory interface 235, the remote memory 240, cloud devices, and/or the network interface 228 may each include circuitry 260, while the processor(s) 202 may include the circuitry 270, which may be in the same enclosure as the system 200 and/or fully integrated on a printed circuit board (PCB) of the system 200. For example, the circuitry 270 may be configured to implement the compute node aspects of the various embodiments, while the circuitry 260 may be configured to implement the pooled memory aspects of the various embodiments.

Advantageously, the circuitry 260 and the circuitry 270 may include technology to implement one or more aspects of the system 10 (FIG. 1), the apparatus 15 (FIG. 2), the method 20 (FIG. 3), the environment 40 (FIG. 4), the environment 50 (FIG. 5), the environment 60 (FIG. 6), the metadata 70 (FIG. 7), and/or any of the pooled memory failover features discussed herein. The system 200 may include further circuitry 260, 270 and located outside of the foregoing components.

In some embodiments, a memory pool may include memory from any of the cloud 229, the memory 214, the storage device 230, and/or the remote memory 240. For example, the circuitry 270 may be configured to allocate a first secure portion of the memory pool to a first instantiation of an application on a first node, and to provide a failover interface for a second instantiation of the application on a second node to access the first secure portion of the memory pool in the event of a failure of the first node. In some embodiments, the circuitry 270 may be further configured to authenticate the second instantiation of the application based on authentication information for the second instantiation of the application. For example, the circuitry 270 may be configured to compare the authentication information for the second instantiation of the application against a trusted source to determine if the authentication of the second instantiation of the application is successful.

In some embodiments, the circuitry 270 may be further configured to provide secure access information for the second instantiation of the application if the authentication is successful, and to associate the first secure portion of the memory pool with the second instantiation of the application. For example, the secure access information may include memory key information and/or an address of memory metadata that is needed to restart the second instantiation of the application. In some embodiments, the circuitry 270 may be further configured to store failover information in a second secure portion of the memory pool, and synchronize the failover information with a host.

ADDITIONAL NOTES AND EXAMPLES

Example 1 includes an electronic apparatus, comprising one or more substrates, and a controller coupled to the one or more substrates, the controller to allocate a first secure portion of a pooled memory to a first instantiation of an application on a first node, and circuitry coupled to the one or more substrates and the controller, the circuitry to provide a failover interface for a second instantiation of the application on a second node to access the first secure portion of the pooled memory in the event of a failure of the first node.

Example 2 includes the apparatus of Example 1, wherein the circuitry is further to authenticate the second instantiation of the application based on authentication information for the second instantiation of the application.

Example 3 includes the apparatus of Example 2, wherein the circuitry is further to compare the authentication information for the second instantiation of the application against a trusted source to determine if the authentication of the second instantiation of the application is successful.

Example 4 includes the apparatus of any of Examples 2 to 3, wherein the circuitry is further to provide secure access information for the second instantiation of the application if the authentication is successful, and associate the first secure portion of the pooled memory with the second instantiation of the application.

Example 5 includes the apparatus of Example 4, wherein the secure access information includes memory key information.

Example 6 includes the apparatus of any of Examples 4 to 5, wherein the secure access information includes an address of memory metadata that is needed to restart the second instantiation of the application.

Example 7 includes the apparatus of any of Examples 1 to 6, wherein the circuitry is further to store failover information in a second secure portion of the pooled memory, and synchronize the failover information with a host.

Example 8 includes an electronic system, comprising pooled memory, a controller communicatively coupled to the pooled memory to allocate a first secure portion of the pooled memory to a first instantiation of an application on a first node, and circuitry communicatively coupled to the controller, the circuitry to provide a failover interface for a second instantiation of the application on a second node to access the first secure portion of the pooled memory in the event of a failure of the first node.

Example 9 includes the system of Example 8, wherein the circuitry is further to authenticate the second instantiation of the application based on authentication information for the second instantiation of the application.

Example 10 includes the system of Example 9, wherein the circuitry is further to compare the authentication information for the second instantiation of the application against a trusted source to determine if the authentication of the second instantiation of the application is successful.

Example 11 includes the system of any of Examples 9 to 10, wherein the circuitry is further to provide secure access information for the second instantiation of the application if the authentication is successful, and associate the first secure portion of the pooled memory with the second instantiation of the application.

Example 12 includes the system of Example 11, wherein the secure access information includes memory key information.

Example 13 includes the system of any of Examples 11 to 12, wherein the secure access information includes an address of memory metadata that is needed to restart the second instantiation of the application.

Example 14 includes the system of any of Examples 8 to 13, wherein the circuitry is further to store failover information in a second secure portion of the pooled memory, and synchronize the failover information with a host.

Example 15 includes a method, comprising allocating a first secure portion of a pooled memory to a first instantiation of an application on a first node, and providing a failover interface for a second instantiation of the application on a second node to access the first secure portion of the pooled memory in the event of a failure of the first node.

Example 16 includes the method of Example 15, further comprising authenticating the second instantiation of the application based on authentication information for the second instantiation of the application.

Example 17 includes the method of Example 16, further comprising comparing the authentication information for the second instantiation of the application against a trusted source to determine if the authentication of the second instantiation of the application is successful.

Example 18 includes the method of any of Examples 16 to 17, further comprising providing secure access information for the second instantiation of the application if the authentication is successful, and associating the first secure portion of the pooled memory with the second instantiation of the application.

Example 19 includes the method of Example 18, wherein the secure access information includes one or more of memory key information and an address of memory metadata that is needed to restart the second instantiation of the application.

Example 20 includes the method of any of Examples 15 to 19, further comprising storing failover information in a second secure portion of the pooled memory, and synchronizing the failover information with a host.

Example 21 includes at least one non-transitory machine readable medium comprising a plurality of instructions that, in response to being executed on a computing device, cause the computing device to allocate a first secure portion of a pooled memory to a first instantiation of an application on a first node, and provide a failover interface for a second instantiation of the application on a second node to access the first secure portion of the pooled memory in the event of a failure of the first node.

Example 22 includes the at least one non-transitory machine readable medium of Example 21, comprising a plurality of further instructions that, in response to being executed on the computing device, cause the computing device to authenticate the second instantiation of the application based on authentication information for the second instantiation of the application.

Example 23 includes the at least one non-transitory machine readable medium of Example 22, comprising a plurality of further instructions that, in response to being executed on the computing device, cause the computing device to compare the authentication information for the second instantiation of the application against a trusted source to determine if the authentication of the second instantiation of the application is successful.

Example 24 includes the at least one non-transitory machine readable medium of any of Examples 22 to 23, comprising a plurality of further instructions that, in response to being executed on the computing device, cause the computing device to provide secure access information for the second instantiation of the application if the authentication is successful, and associate the first secure portion of the pooled memory with the second instantiation of the application.

Example 25 includes the at least one non-transitory machine readable medium of Example 24, wherein the secure access information includes one or more of memory key information and an address of memory metadata that is needed to restart the second instantiation of the application.

Example 26 includes the at least one non-transitory machine readable medium of any of Examples 21 to 25, comprising a plurality of further instructions that, in response to being executed on the computing device, cause the computing device to store failover information in a second secure portion of the pooled memory, and synchronize the failover information with a host.

Example 27 includes an apparatus, comprising means for allocating a first secure portion of a pooled memory to a first instantiation of an application on a first node, and means for providing a failover interface for a second instantiation of the application on a second node to access the first secure portion of the pooled memory in the event of a failure of the first node.

Example 28 includes the apparatus of Example 27, further comprising means for authenticating the second instantiation of the application based on authentication information for the second instantiation of the application.

Example 29 includes the apparatus of Example 28, further comprising means for comparing the authentication information for the second instantiation of the application against a trusted source to determine if the authentication of the second instantiation of the application is successful.

Example 30 includes the apparatus of any of Examples 28 to 29, further comprising means for providing secure access information for the second instantiation of the application if the authentication is successful, and means for associating the first secure portion of the pooled memory with the second instantiation of the application.

Example 31 includes the apparatus of Example 30, wherein the secure access information includes one or more of memory key information and an address of memory metadata that is needed to restart the second instantiation of the application.

Example 32 includes the apparatus of any of Examples 27 to 31, further comprising means for storing failover information in a second secure portion of the pooled memory, and means for synchronizing the failover information with a host.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores, may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
   one or more substrates; and
   a controller coupled to the one or more substrates, the controller to allocate a first secure portion of a pooled memory to a first instantiation of an application on a first node; and
   circuitry coupled to the one or more substrates and the controller, the circuitry to:
      detect an initiation of a second instantiation of the application at a second node, wherein the initiation is based on a failure of the first node;
      provide a failover interface at the second node; and
      with the failover interface:
         receive, from an operating system at the second node, an identifier of the application, wherein the failover interface is to receive the identifier based on an authentication request from the second instantiation to the operating system;
         send the identifier from the second node to a failover manager at the pooled memory, wherein, based on the identifier, an authentication of the second instantiation is to be performed with the failover manager and a trusted server; and
         based on the authentication, receive authentication information from the failover manager, the authentication information comprising an address of metadata in the pooled memory, wherein the second node is to execute the second instantiation with the metadata and the first secure portion of the pooled memory.

2. The electronic apparatus of claim 1, wherein the metadata comprises a page table.

3. The electronic apparatus of claim 1, wherein the circuitry is further to perform the authentication of the second instantiation.

4. The electronic apparatus of claim 1, wherein the circuitry is further to:
   associate the first secure portion of the pooled memory with the second instantiation of the application based on the authentication.

5. The electronic apparatus of claim 1, wherein the circuitry is further to:
   store failover information in a second secure portion of the pooled memory; and
   synchronize the failover information with a host.

6. An electronic system, comprising:
   pooled memory;
   a controller communicatively coupled to the pooled memory to allocate a first secure portion of the pooled memory to a first instantiation of an application on a first node; and
   circuitry communicatively coupled to the controller, the circuitry to:
      detect an initiation of a second instantiation of the application at a second node, wherein the initiation is based on a failure of the first node;
      provide a failover interface at the second node; and
      with the failover interface:
         receive, from an operating system at the second node, an identifier of the application, wherein the failover interface is to receive the identifier based on an authentication request from the second instantiation to the operating system;
         send the identifier from the second node to a failover manager at the pooled memory, wherein, based on the identifier, an authentication of the second instantiation is to be performed with the failover manager and a trusted server; and
         based on the authentication, receive authentication information from the failover manager, the authentication information comprising an address of metadata in the pooled memory, wherein the second node is to execute the second instantiation with the metadata and the first secure portion of the pooled memory.

7. The electronic system of claim 6, wherein the metadata comprises a page table.

8. The electronic system of claim 6, wherein the circuitry is further to perform the authentication of the second instantiation.

9. The electronic system of claim 6, wherein the circuitry is further to:
   associate the first secure portion of the pooled memory with the second instantiation of the application based on the authentication.

10. The electronic system of claim 6, wherein the circuitry is further to:
    store failover information in a second secure portion of the pooled memory; and
    synchronize the failover information with a host.

11. A method, comprising:
    allocating a first secure portion of a pooled memory to a first instantiation of an application on a first node;
    detecting an initiation of a second instantiation of the application at a second node, wherein the initiation is based on a failure of the first node;
    providing a failover interface at the second node; and
    with the failover interface:
       receiving, from an operating system at the second node, an identifier of the application, wherein the failover interface receives the identifier based on an authentication request from the second instantiation to the operating system;
       sending the identifier from the second node to a failover manager at the pooled memory, wherein, based on the identifier, an authentication of the second instantiation is performed with the failover manager and a trusted server; and
       based on the authentication, receiving authentication information from the failover manager, the authentication information comprising an address of metadata in the pooled memory, wherein the second node executes the second instantiation with the metadata and the first secure portion of the pooled memory.

12. The method of claim 11, wherein the metadata comprises a page table.

13. The method of claim 11, further comprising performing the authentication of the second instantiation.

14. The method of claim 11, further comprising:
associating the first secure portion of the pooled memory with the second instantiation of the application based on the authentication.

15. The method of claim 11, further comprising:
storing failover information in a second secure portion of the pooled memory; and
synchronizing the failover information with a host.

* * * * *